United States Patent
Teicher et al.

(10) Patent No.: US 7,900,061 B2
(45) Date of Patent: *Mar. 1, 2011

(54) METHOD AND SYSTEM FOR MAINTAINING BACKUP OF PORTABLE STORAGE DEVICES

(75) Inventors: Mordechai Teicher, Hod Hasharon (IL); Tal Segalov, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 468 days.

This patent is subject to a terminal disclaimer.

(21) Appl. No.: 11/764,239

(22) Filed: Jun. 18, 2007

(65) Prior Publication Data

US 2008/0077808 A1 Mar. 27, 2008

Related U.S. Application Data

(63) Continuation of application No. 10/704,611, filed on Nov. 12, 2003, now Pat. No. 7,240,219.

(60) Provisional application No. 60/473,573, filed on May 25, 2003.

(51) Int. Cl.
*G06F 12/14* (2006.01)

(52) U.S. Cl. .......................... 713/193; 713/187; 726/35

(58) Field of Classification Search ........................ None
See application file for complete search history.

(56) References Cited

U.S. PATENT DOCUMENTS

| | | | |
|---|---|---|---|
| 5,265,164 A | 11/1993 | Matyas et al. | |
| 5,457,746 A | 10/1995 | Dolphin | |
| 5,533,125 A | 7/1996 | Bensimon et al. | |
| 5,802,175 A | 9/1998 | Kara | |
| 5,940,507 A | 8/1999 | Cane et al. | |
| 6,005,942 A | 12/1999 | Chan et al. | |
| 6,038,665 A | 3/2000 | Bolt et al. | |
| 6,351,813 B1 | 2/2002 | Mooney et al. | |
| 6,577,735 B1 * | 6/2003 | Bharat | 380/286 |
| 6,725,200 B1 | 4/2004 | Rost | |
| 6,986,050 B2 | 1/2006 | Hypponen | |
| 7,240,219 B2 | 7/2007 | Teicher et al. | |

(Continued)

FOREIGN PATENT DOCUMENTS

WO  WO 2003/046827  6/2003

OTHER PUBLICATIONS

Supplementary European Search Report issued in European application No. 04733902.3 on Jul. 7, 2009 (3 pages).

(Continued)

*Primary Examiner*—Pramila Parthasarathy
(74) *Attorney, Agent, or Firm*—Brinks Hofer Gilson & Lione

(57) ABSTRACT

Data stored in a portable storage device are encrypted, for example by a processor of the portable storage device itself, using a backup key and stored in a backup medium. The backup key is protected by being stored in a backup key storage medium, such as an internet server, a pocketable medium or a trusted computer, preferably after being encrypted using a password. As needed, the backup key is retrieved and used to decrypt the data from the backup medium. The decrypted data are restored to the original portable storage device or to a different portable storage device.

31 Claims, 9 Drawing Sheets

U.S. PATENT DOCUMENTS

| | | | |
|---|---|---|---|
| 7,257,717 B2 * | 8/2007 | Huang | 713/193 |
| 7,478,248 B2 | 1/2009 | Ziv et al. | |
| 2003/0208382 A1 | 11/2003 | Westfall | |
| 2003/0212894 A1 | 11/2003 | Buck et al. | |
| 2004/0103288 A1 | 5/2004 | Ziv et al. | |
| 2004/0123113 A1 | 6/2004 | Mathiassen et al. | |
| 2004/0123127 A1 | 6/2004 | Teicher et al. | |
| 2004/0199779 A1 | 10/2004 | Huang | |

OTHER PUBLICATIONS

Office Action issued in U.S. Appl. No. 10/704,611 on Feb. 10, 2005, 36 pages.

Office Action issued in U.S. Appl. No. 10/704,611 on Jun. 14, 2005, 13 pages.

Office Action issued in U.S. Appl. No. 10/704,611 on Oct. 27, 2005, 12 pages.

Advisory Action issued in U.S. Appl. No. 10/704,611 on Jan. 23, 2006, 3 pages.

Office Action issued in U.S. Appl. No. 10/704,611 on Jul. 14, 2006, 14 pages.

Office Action issued in U.S. Appl. No. 10/704,611 on Dec. 15, 2006, 14 pages.

U.S. Appl. No. 10/359,195, filed Feb. 2003, Teicher et al.

Physical Security Devices for Computer Subsystems: A Survey of Attacks and Defenses—Steve H. Weingart Secure Systems and Smart Card Group IBM Thomas J. Watson Research Center, Hawthorne NY weingart@us.ibm.com, 15 pages.

* cited by examiner

METHOD AND SYSTEM FOR MAINTAINING BACKUP OF PORTABLE STORAGE DEVICES

This is a continuation of U.S. patent application Ser. No., 10/704,611, which is a continuation-in-part of U.S. Provisional Patent Application Ser. No. 60/473,573, filed on May 25, 2003.

FIELD AND BACKGROUND OF THE INVENTION

The present invention relates to portable storage devices, and in particular to secure portable storage devices.

Portable storage devices such as floppy disks, optical disks, flash memory disks and digital tapes, serve users for various purposes, such as copying files from one computer to another, carrying a backup copy of one's files, or synchronizing work spaces among the hard disks of an office PC, a home PC and a laptop computer.

A portable storage device can be lost or stolen, exposing its owner to the risk of others reading sensitive information from his or her work or private files. Therefore, it is highly desirable to secure the contents of portable storage devices by encryption and/or by blocking unauthorized access to stored data by hardware means, as described, for example, in co-pending U.S. patent application Ser. Nos. 10/304,772 and 10/359,195, both of which are incorporated by reference for all purposes as if fully set forth herein.

Another risk associated with the loss of a portable storage device, as well as with technical faults, is the loss of critical or important data that are impossible or hard to retrieve from their original sources. For example, a traveling businessperson may use his or her portable storage device to collect presentations, white papers and contract drafts, which may be very hard to obtain again if the originals are lost. Thus, a routine backup of the contents of a portable storage device is often a necessity. Such backup may be done to a compact disk, to a hard drive of a personal computer, or to a remote server over the Internet. However, such backup may compromise the security of the contents, which security is otherwise maintained very tightly. For example, a traveler who carries sensitive data secured within a flash disk, may compromise the security of the data by carrying a CD with a clear backup copy of the data.

There is thus a widely recognized need for, and it would be highly advantageous to have, a backup solution, for data carried in a portable storage device, that offers data security while being also convenient, flexible and efficient.

SUMMARY OF THE INVENTION

The present invention provides systems and functionalities for secure and convenient backup of data stored in a secure portable storage device.

Another object of the present invention is to allow a user to restore all or the majority of functionalities of his or her portable storage device from a backup medium.

Therefore, according to the present invention there is provided a method of securely storing data, including the steps of: (a) storing the data in a first portable storage device; (b) encrypting the data using a backup key, thereby providing encrypted backup data; (c) protecting the backup key, thereby providing a protected backup key; (d) retrieving the protected backup key; and (e) decrypting the encrypted backup data, using the retrieved backup key, thereby providing recovered data.

Furthermore, according to the present invention there is provided a system for securely storing data, including: (a) a first portable storage device for storing the data; (b) a backup medium, separate from the first portable storage device, wherein the data are stored as encrypted backup data after having been encrypted using a backup key; and (c) a backup key storage medium, separate from both the first portable storage device and from the backup medium, for storing the backup key.

Furthermore, according to the present invention there is provided a method of securely storing data, including the steps of: (a) storing the data in a first portable storage device; (b) encrypting the data using a backup key, thereby providing encrypted backup data, the encrypting being effected by a processor of the first portable storage device; and (c) storing the encrypted backup data in a backup medium.

Furthermore, according to the present invention there is provided a method of securely storing data, including the steps of: (a) storing the data in a first portable storage device; (b) encrypting the data, thereby providing encrypted backup data; (c) decrypting the encrypted backup data, thereby providing recovered data; and (d) storing the recovered data only in at least one target portable storage device.

Furthermore, according to the present invention there is provided a method of secure backup and retrieval of data stored in a first portable storage device, including the steps of: (a) encrypting the data using a backup key, thereby providing encrypted backup data; (b) storing the encrypted backup data in a backup medium separate from the first portable storage device; (c) protecting the backup key, thereby providing a protected backup key; (d) retrieving the protected backup key; (e) retrieving the encrypted backup data from the backup medium; (f) decrypting the encrypted backup data, using the retrieved backup key, thereby providing recovered data; and (g) storing the recovered data in a target portable storage device selected from the group consisting of the first portable storage device and a second portable storage device.

Furthermore, according to the present invention there is provided a system for securely storing data, including: (a) a first portable storage device for storing the data; (b) a backup medium, separate from the first portable storage device, wherein the data are stored as encrypted backup data after having been encrypted using a backup key; (c) a backup key storage medium, separate from both the first portable storage device and from the backup medium, for storing the backup key; and (d) a target portable storage device for storing the data as decrypted backup data obtained by decrypting the encrypted backup data using the backup key.

Furthermore, according to the present invention there is provided a method of secure backup and retrieval of data stored in a first portable storage device, including the steps of: (a) encrypting the data using a processor of the first portable storage device and a backup key, thereby providing encrypted backup data; (b) storing the encrypted backup data in a backup medium separate from the first portable storage device; (c) protecting the backup key, thereby providing a protected backup key; (d) retrieving the protected backup key; (e) retrieving the encrypted backup data from the backup medium; (f) decrypting the encrypted backup data, using the retrieved backup key and a processor of a target portable storage device selected from the group consisting of the first portable storage device and a second portable storage device, thereby providing recovered data; and (g) storing the recovered data in the target portable storage device.

Furthermore, according to the present invention there is provided a system for securely storing data, including: (a) a first portable storage device for storing the data, the first portable storage device including a respective processor for encrypting the data as encrypted backup data, using a backup key; (b) a backup medium, separate from the first portable storage device, for storing the encrypted backup data; (c) a backup key storage medium, separate from both the first portable storage device and the backup medium, for storing the backup key; and (d) a target portable storage device for storing the data as decrypted backup data, the target portable storage device including a respective processor for decrypting the encrypted backup data, using the backup key, to provide the decrypted backup data.

A first aspect of the present invention is a method of securely storing data. The data are stored initially in a first portable storage device. Then, for security, the data are encrypted using a backup key, thereby transforming the data into encrypted backup data. The backup key is protected as a protected backup key. When the data need to be restored, the protected backup key is retrieved and the encrypted backup data are decrypted.

Preferably, storing the data in the first portable storage medium includes encrypting the data using a portable storage device key that may be either identical to the backup key or different from the backup key.

Preferably, the backup key is protected by being stored in an internet server, in a pocketable medium or in a trusted computer. Nonlimiting examples of trusted computers are given in co-pending U.S. patent application Ser. No. 10/359, 195.

Preferably, protecting the backup key includes encrypting the backup key, and retrieving the protected backup key includes decrypting the protected backup key. More preferably, the backup key is encrypted using an encryption password that is stored in a backup key storage device that is used to protect the backup key by storing the backup key therein; and the method of the present invention also includes providing an alleged encryption password to the backup key storage device. Examples of backup key storage devices include an internet server and a trusted computer that are used to store the backup key. The backup key storage device permits retrieval of the backup key stored therein only if the alleged encryption password is identical to the encryption password actually used to encrypt the backup key. Most preferably, the backup key storage device allows only a predetermined number of attempts to provide the alleged password before blocking further attempts to retrieve the backup key by providing an alleged password. Also most preferably, the method of the present invention includes the step of changing the encryption password.

Preferably, the first portable storage device includes a processor, and the encryption of the data is effected by the processor.

Preferably, the method of the first aspect of the present invention also includes the step of storing the backup key in the first portable storage device.

Preferably, the method of the first aspect of the present invention also includes the step of storing, in the first portable storage device, a description of how the backup key is protected, for example a description of the location in which the backup key is stored.

Preferably, the method of the first aspect of the present invention also includes the step of storing the encrypted backup data in a backup medium. Most preferably, protecting the backup key includes encrypting the backup key and storing the encrypted backup key in a backup key storage device that is separate from the backup medium. Also most preferably, a description of how the backup key is protected, for example a description of the location in which the backup key is stored, also is stored in the backup medium.

Also most preferably, the backup medium is separate from the first portable storage device.

Preferably, the method of the first aspect of the present invention also includes the step of storing the recovered data in a target portable storage device that may be either the original first portable storage device or a separate second portable storage device. Most preferably, the target portable storage device includes a processor that is used to decrypt the encrypted backup data. Also most preferably, the target portable storage device is a pocketable storage device such as a floppy disk, an optical disk, a flash memory disk or a digital tape.

Preferably, the first portable storage device includes a memory area for storing the backup key. Most preferably, the memory area is a protected memory area.

Preferably, the first portable storage device is a pocketable storage device such as a floppy disk, an optical disk, a flash memory disk or a digital tape.

Corresponding to the method of the first aspect of the present invention is a system with three basic components. The first component is a first portable storage device. The second component is a backup medium, separate from the first portable storage device, in which the data are stored as encrypted backup data after having been encrypted using a backup key. The third component is a backup key storage medium, separate from the first two components, for storing the backup key.

Preferably, the system of the first aspect of the present invention also includes at least one computer for writing the encrypted backup data to the backup medium and for reading the encrypted backup data from the backup medium. More preferably, the system of the present invention also includes a second portable storage device, that may be either identical to the first portable storage device or different from the first portable storage device, in which the data are stored as recovered data, by the computer that reads the encrypted backup data from the backup medium, following the decryption of the encrypted backup data. Most preferably, the second portable storage device is a pocketable storage device such as a floppy disk, an optical disk, a flash memory disk or a digital tape.

Preferably, the system of the first aspect of the present invention also includes a second portable storage device, that may be either identical to the first portable storage device or different from the first portable storage device, in which the data are stored as recovered data following the decryption of the encrypted backup data. Most preferably, the second portable storage device includes a processor for decrypting the encrypted backup data. Also most preferably, the second portable storage device is a pocketable storage device such as a floppy disk, an optical disk, a flash memory disk or a digital tape.

Preferably, the first portable storage device includes a processor for encrypting the data.

Preferably, the backup key storage medium includes an internet server, a pocketable medium or a trusted computer. Most preferably, the internet server includes a memory area for storing both the backup key and a representation (for example a hash) of an encryption password that is used to encrypt the backup key before storing the backup key in the memory area.

Preferably, the first portable storage device is a pocketable storage device such as a floppy disk, an optical disk, a flash memory disk or a digital tape.

A second aspect of the present invention is a method of securely storing data. The data initially are stored in a first portable storage device. Then, for security, the data are encrypted by a processor of the first storage device using a backup key, thereby transforming the data into encrypted backup data. The encrypted backup data are stored in a backup medium that preferably is separate from the first portable storage device.

Preferably, the method of the second aspect of the present invention also includes generating the backup key and storing the backup key in the first portable storage device. Most preferably, the backup key is generated by the first portable storage device. Also most preferably, the backup key is stored in a protected area of the first portable storage device.

Preferably, the method of the second aspect of the present invention also includes encrypting the backup key, thereby providing an encrypted backup key, and storing the encrypted backup key in the backup medium. Most preferably, the backup key itself is used to encrypt the backup key.

Preferably, the method of the second aspect of the present invention also includes retrieving the encrypted backup data from the backup medium, decrypting the retrieved encrypted backup data using the backup key so as to provide recovered data, and storing the recovered data in a target portable storage device that could be either the original first portable storage device or a second portable storage device. Most preferably, the decrypting is done by a processor of the target portable storage device. Also most preferably, the second portable storage device is a pocketable storage device such as a floppy disk, an optical disk, a flash memory disk or a digital tape.

Preferably, the first portable storage device is a pocketable storage device such as a floppy disk, an optical disk, a flash memory disk or a digital tape.

A third aspect of the present invention is a method of securely storing data. The data are initially stored in a first portable storage device. Then, for security, the data are encrypted by a processor of the first storage device, thereby transforming the data into encrypted backup data. Later, the encrypted backup data are decrypted, thereby providing recovered data. The recovered data are stored only in one or more target portable storage devices. Among the one or more target portable storage devices may be the original first portable storage device itself and other, second portable storage devices.

Preferably, the method of the third aspect of the present invention includes, subsequent to the encryption and prior to the decryption, storing the encrypted backup data in a backup medium that is separate from both the first portable storage device and all the target portable storage devices.

Preferably, the portable storage devices are pocketable storage devices such as floppy disks, optical disks, flash memory disks or digital tapes.

DEFINITIONS

By "computer" is meant an apparatus used by a user to generate or use data. Examples of computers include personal computers, digital cameras, personal digital assistants (PDAs), mobile communicators and digital music players.

By "portable storage device" is meant a standalone device selectably connectable to a computer for data exchange. Examples of a portable storage device include a floppy disk, an optical disk, a flash memory disk and a digital tape. These exemplary portable storage devices also are "pocketable", in the sense that a user can easily carry one of these devices on his or her person.

By "secure portable storage device" is meant a portable storage device designed to protect the data stored therein by encryption and/or access restrictions. Examples of secure portable storage devices are described in co-pending U.S. patent application Ser. Nos. 10/304,772 and 10/359,195.

By "user credentials" is meant data available to the user and unavailable to others. Examples of user credentials include a secret password, and biometric parameters based on fingerprint, handwritten signature, or face, voice or retina recognition. In the context of the present invention, the presentation of user credentials may be required as a condition for gaining access to secured data.

By "maximum number of attempts", also abbreviated "MAX_NOA", is meant the number of times a user is allowed to present his or her credentials, e.g. keying-in a password. Logical and/or hardware means block additional attempts to present credentials. MAX_NOA is customarily used to block so-called "brute force attacks", which are based on guessing all possible variations of user credentials.

By "encryption key", or "key", is meant a binary string used to encrypt data by a cryptographic process.

By "internet" is meant a collection of interconnected computer networks. The best known internet is the worldwide Internet.

By a "representation" of a password is meant a transformation of the password that allows the original password to be uniquely verified. Typically, the transformation of a password is a hash of the password; but the scope of the term "representation" also includes the identity transformation, so that a password is considered to be a representation of itself.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and system for securing data. Specifically, the present invention can be used to secure data stored in a portable storage device.

The principles and operation of secure data storage according to the present invention may be better understood with reference to the drawings and the accompanying description.

Figure 1:
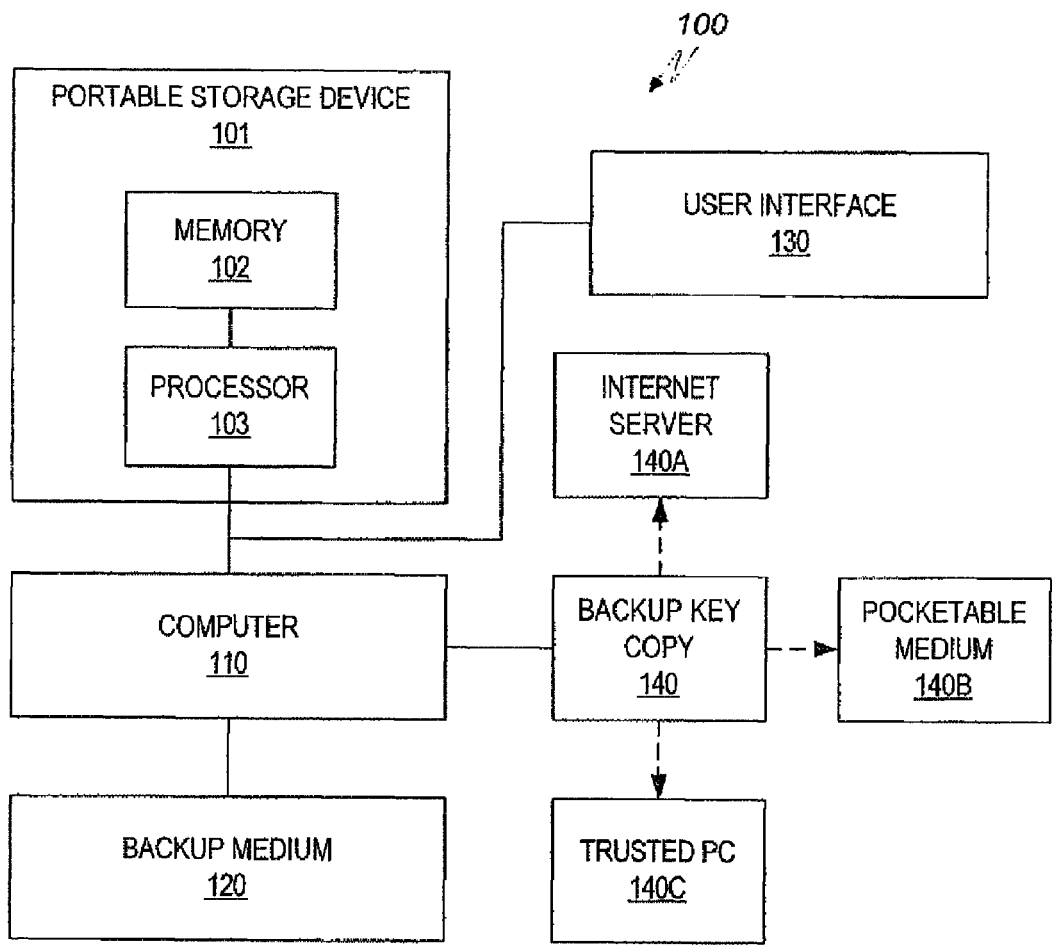
FIG. 1 is a high level block diagram of a system of the present invention.

Referring now to the drawings, FIG. 1 illustrates the general layout of a system 100 representing a preferred embodiment of the present invention. A portable storage device 101 includes a memory 102 and a processor 103. Portable storage device 101 is preferably secure, hence memory 102 stores user files in encrypted form, and processor 103 is operative to encrypt data to be stored in memory 102 and/or limit access to memory 102, as described in co-pending U.S. patent application Ser. Nos. 10/304,772 and 10/359,195. It should be noted, however, that encryption of the contents of memory 102, the role of processor 103 in such encryption, and the associated encryption keys, are independent of and separate from the backup encryption which is the subject of the present invention. Thus, within the scope of the present invention, memory 102 stores user data in encrypted or clear format, while processor 103 preferably participates in the encryption of the backup process, as described below. A computer 110, for example a personal computer, manages the backup and restore procedures described below, wherein possibly two different computers 110 are used for backup and restore. A backup medium 120, such as a fixed or removable hard disk, a CD-ROM, or an internet server, is used to store an encrypted backup copy of memory 102. A user interface 130, usually part of computer 110, is used to enter passwords and control the various operations described below; it should be noted that part of user interface 130 may be included in portable storage device 101, primarily for entering user credentials such as a password or a fingerprint. A backup key copy 140, accessible to the user only, is used as part of a restore process, as is described in more detail below. Backup key copy 140 is stored in a backup key storage medium. As examples of the backup key storage medium: backup key copy 140 can be stored in a pocketable medium 140B, such as a paper printout or a diskette; backup key copy 140 can be stored on a trusted PC 140C, e.g. the user's private PC kept safely at home, or backup key copy 140 can be secured in an internet server 140A, to allow wider accessibility (if the internet in question is the Internet then the accessibility is universal).

Figure 2:
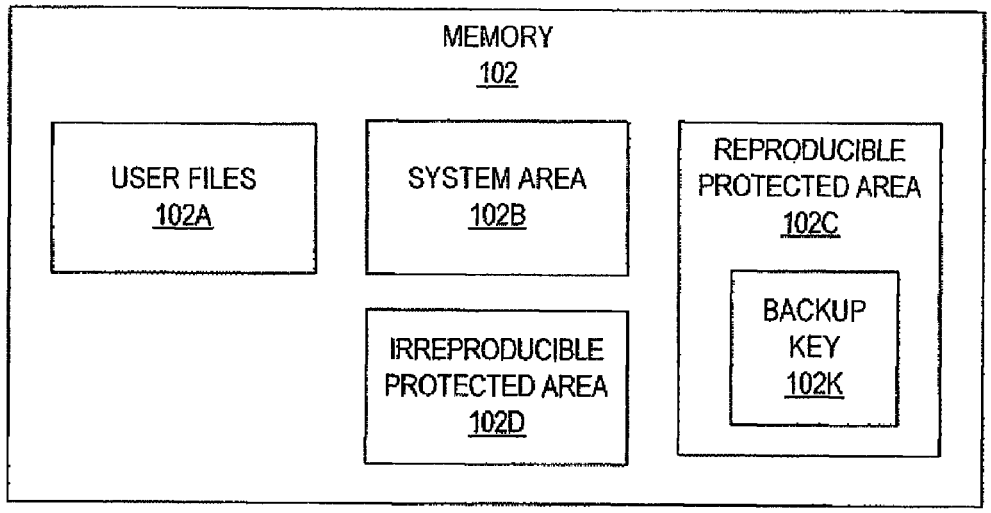
FIG. 2 illustrates exemplary contents of the memory of the portable storage device of FIG. 1.

FIG. 2 illustrates exemplary preferable contents of memory 102 of FIG. 1. User files 102A include files created, downloaded, received or copied by the user while using application programs or digital appliances, browsing the Internet, receiving emails or copying files from others. A system area 102B stores data generated automatically by the system, for example a FAT (file allocation table) or an alternative file system used for file management. Protected areas 102C and 102D are optionally included, to offer extra protection against physical, electrical and logical penetration. The design of such protected areas is well known in the art from the field of smart cards. See, for example, S. H. Weingart, "Physical security devices for computer subsystems: a survey of attacks and defenses", *Lecture Notes in Computer Science* vol. 1965 pp. 302-317 (2001), which publication is incorporated by reference for all purposes as if fully set forth herein. While data in areas 102A and 102B may be exposed to penetration but are protected by encryption under secret keys, protected area 102C keeps such secret keys, as well as other private user credentials, access rights and system parameters. Specifically, the backup key used to encrypt the backup copy on backup medium 120, preferably is stored in a register 102K within reproducible protected area 102C. The term 'reproducible' is used to include the contents of area 102C in the backup and restore procedures of the present invention, so that a restored portable storage device according to the present invention has all the capabilities enabled by the contents of reproducible protected area 102C. By contrast, an irreproducible protected area 102D includes data that are excluded from the backup and restore processes of the present invention. An example of such excluded data is a digital representation of a stored value, representing money, tickets, phone calls, etc., that is not allowed to be duplicated and therefore cannot be backed-up and restored.

Figure 3:
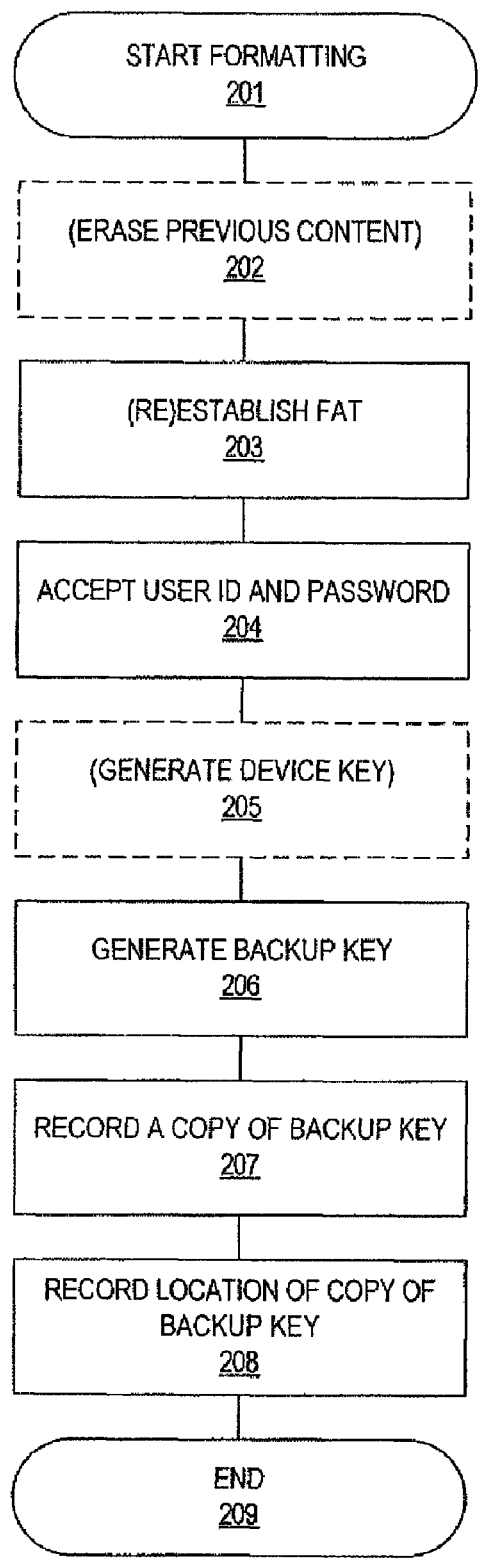
FIG. 3 is a flow chart of the formatting procedure of the portable storage device of FIG. 1.

FIG. 3 is a flow chart of the formatting procedure of portable storage device 101. Formatting is initiated at step 201 by connecting portable storage device 101 to computer 110 and entering a 'format' command at user interface 130. In optional step 202, the previous contents of memory 102 are erased. In step 203, a file allocation table (FAT) or an alternative file system is established, or reestablished if portable storage device 101 is being reformatted. The FAT preferably is stored in system area 102B of FIG. 2. In step 204, the user is prompted at user interface 130 to select and key-in a user ID and a password, which are then stored in memory 102, preferably within reproducible protected area 102C. A device key is randomly generated by processor 103 in optional step 205, for encrypting the contents stored within memory 102, as described, for example, in co-pending U.S. patent application Ser. Nos. 10/304,772 and 10/359,195. In step 206, processor 103 generates a backup key, to be used in the future for encrypting contents from memory 102 prior to sending the encrypted contents to backup medium 120. In step 207, a copy of the backup key generated in step 206, in clear or encrypted form, is recorded by computer 110 on an external device such as an internet server, a pocketable medium or a trusted PC; various options for storing this copy are described below with respect to FIGS. 7, 11 and 14. In step 208, the location of the backup copy, e.g. an internet address of an internet server, or a description such as 'paper copy' or 'home PC', is stored in memory 102, to facilitate key retrieval when needed in the future. The procedure is concluded in step 209, allowing portable storage device 101 to be disconnected from computer 110.

It should be noted that that backup key stored in register 102K (FIG. 3) and generated in step 206 preferably is sufficiently long and random to withstand brute force attacks. On the other hand, a user password, such as the user password entered in step 204, needs to be memorized, and therefore is relatively short and alphanumeric, with user tendency to include dictionary words. The user password thus is vulnerable to brute force attacks. As a remedy, a MAX_NOA (maximum number of attempts) mechanism is employed, where appropriate, as described below.

Figure 4:
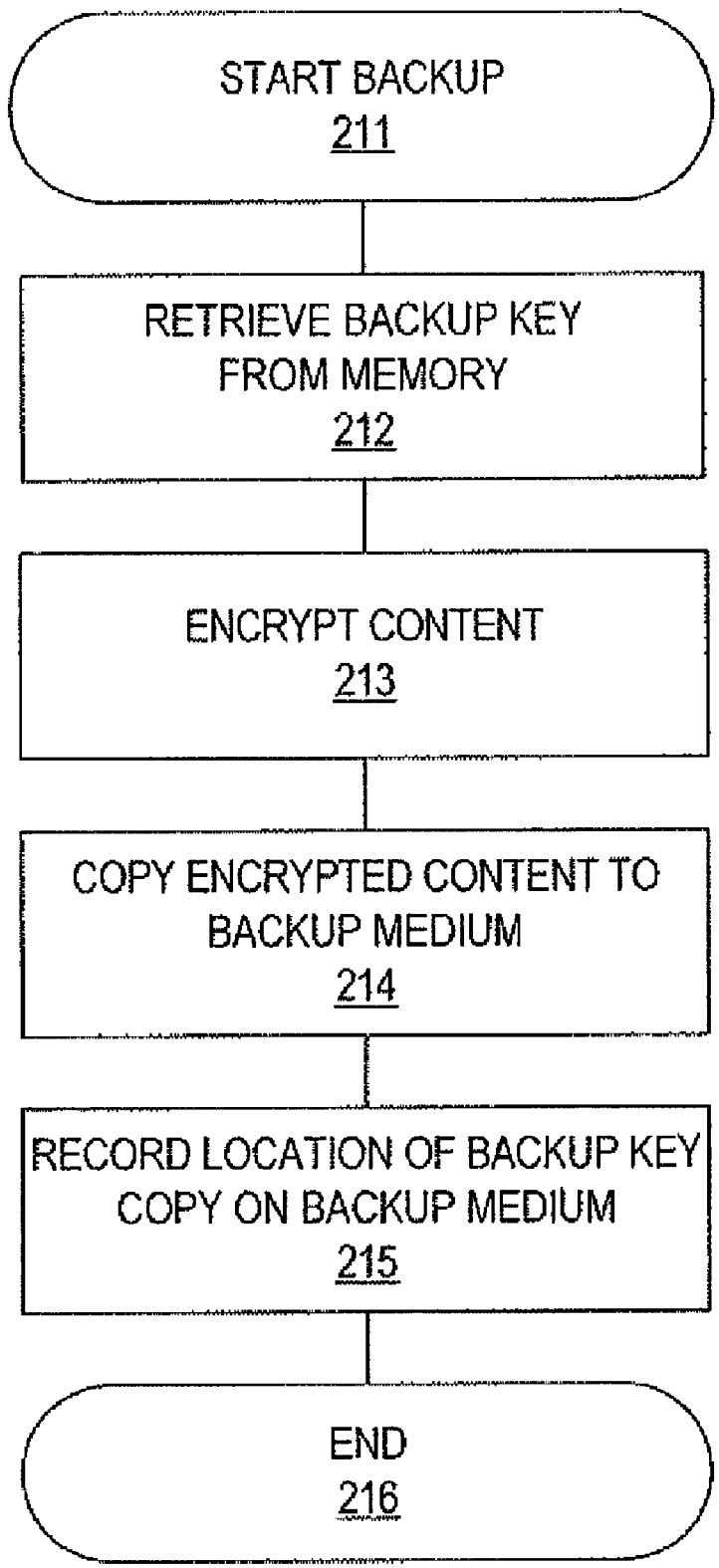
FIG. 4 is a flowchart of a general backup procedure.

FIG. 4 is a flowchart of a general backup procedure according to a preferred embodiment of the present invention. Backup starts in step 211, where computer 110 is connected to portable storage device 101 and to backup medium 120, and a backup procedure is called, either automatically upon such connections or by the user through user interface 130. In step 212, the backup key is retrieved from backup key area 102K of memory 102, and is used by processor 103 in step 213 to encrypt all or part of the contents of memory 102. Preferably, the contents of memory areas 102A, 102B and 102C are backed up, but the contents of memory area 102D, if such exists, are not backed up. In step 214 the encrypted contents are copied to backup medium 120. In step 215 the location of copy 140 of the backup key, previously stored in memory 102 in step 208 of the format procedure, is also recorded on backup medium 120 to facilitate restore operation in the future. The procedure is concluded in step 216, where portable storage device 101 can be disconnected from computer 110, and, where appropriate, also backup medium 120 can be disconnected from computer 110.

Figure 5:
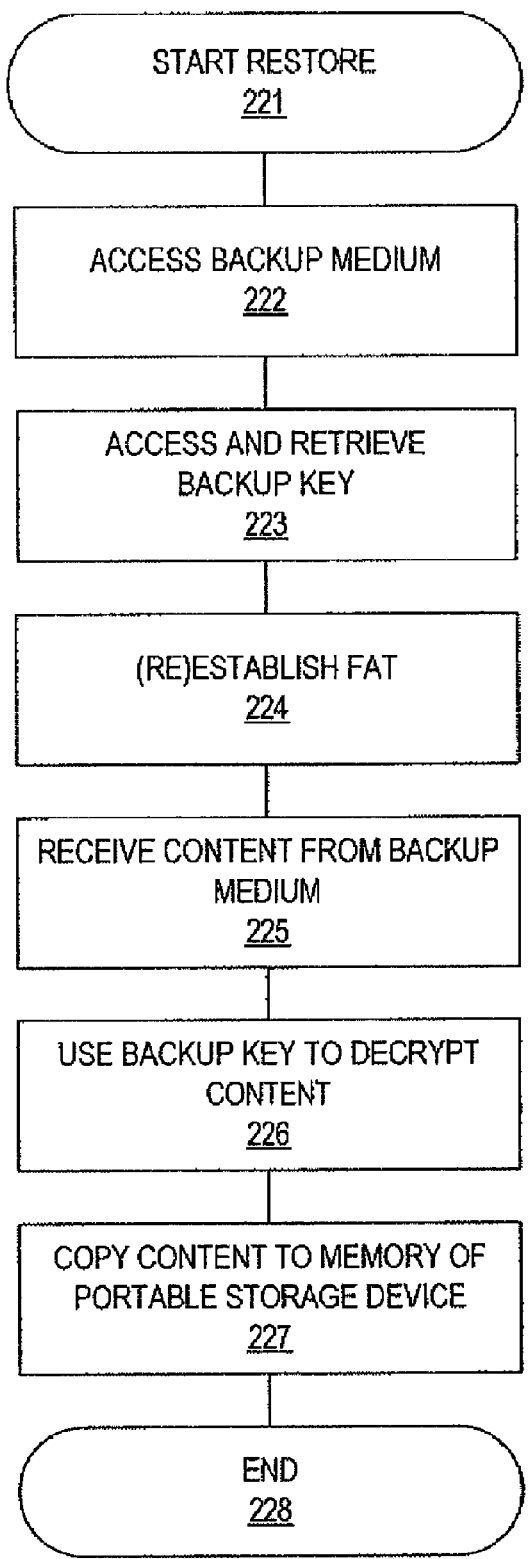
FIG. 5 is a flowchart of a general restore procedure.

FIG. 5 is a flowchart of a general restore procedure according to a preferred embodiment of the present invention, aiming at restoring the contents of the original portable storage device 101, which have been backed up into backup medium 120, into a target portable storage device 101. In the common case, this procedure is called after the original portable storage device 101 has been lost or damaged, and the target portable storage device 101 then is a replacement portable storage device 101 with equal or larger memory capacity. Alternatively, only the contents of the original portable storage device 101 may have been corrupted, and then the original portable storage device 101 is the target portable storage device 101 to be restored from backup medium 120.

In step 221, computer 110 is connected to both target portable storage device 101 and backup medium 120, and the restore procedure is called by the user through is user interface 130. Backup medium 120 has already been loaded with backup contents of an original portable storage device 101 via the backup procedure of FIG. 4. In step 222, backup medium 120 is accessed to identify the location of backup key copy 140. In step 223, backup key copy 140 is accessed and retrieved. In step 224, the FAT (file allocation table) or an equivalent file management table of memory 102 is established, or reestablished if portable storage device 101 has been used before; this has the effect of conventional formatting, i.e. clearing memory 102 from old contents and preparing memory 102 to receive new contents. It should be noted that this 'formatting' encompasses most areas of memory 102, including 102A, 102B, and 102C, but memory area 102D, if such exists, remains intact. In step 225, the contents from backup medium 120 flow to processor 103. In step 226, backup key 140 retrieved in step 223 is used by processor 103 to decrypt the contents received in step 225. In step 227, the clear contents, which are identical to the contents of the original portable storage device 101 used to create backup 120 through the procedure of FIG. 4, are copied into memory 102, thus restoring the contents and functionality of the original storage device, except with respect to irreproducible protected area 102D, which remains intact. In step 228, the restore procedure is concluded and target portable storage device 101 can be removed from computer 110.

It should be noted that the backup and restore procedures of FIGS. 4 and 5 are run cooperatively both on computer 110 and on processor 103 of portable storage device 101. The associated software may reside on either or both of portable storage device 101 and computer 110. One could move part or all of the encryption and decryption tasks from processor 103 to computer 110, depending on performance considerations and the level of trust granted to computer 110.

It should also be noted that if the contents of memory 102 of the original storage device were protected by encryption and/or access control, so are the contents of the restored memory. This protection is independent of the backup encryption of the present invention, and should not be confused therewith. If such device-level protection has been employed, the respective device-level keys (such as the one produced in step 205 of FIG. 3) are restored into memory areas 102B and/or 102C, thus allowing the legitimate user to resume working with the replacement portable storage device 101 using the same user credentials he or she used to access the original portable storage device 101.

When an original portable storage device 101 has been lost or damaged, the readily-available information is backup medium 120, storing an encrypted mirror of the original contents. This backup medium, residing for example on a CD, hard disk or an internet server, requires access to backup key copy 140 in order to restore the original contents. FIGS. 6-16 below illustrate various preferred embodiments for keeping and maintaining backup key copy 140.

Figure 6:
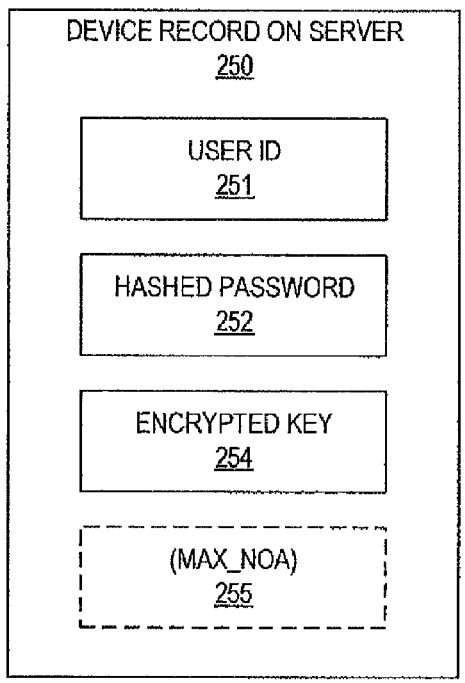
FIG. 6 shows a record of a backup key as stored in an internet server.

In one preferred embodiment, backup key copy 140 is kept in a database on a trusted internet server 140A. FIG. 6 illustrates a record 250 of such a backup key 140 on internet server 140A. Field 251 includes the User ID, originally entered into portable storage device 101 in step 204 of FIG. 3. Field 252 includes a hash of the user's password that also was produced in step 204. Field 254 includes the backup key that was generated in step 206 of FIG. 3, encrypted using the user password. Field 255 is optional, and includes a MAX_NOA (maximum number of attempts) assigned to the key by the user or by the system; it should be noted that this parameter affects the probability that an adversary will successfully guess the password. The MAX_NOA parameter may be determined to be a global system parameter (e.g. three attempts), or to be selected by the user, or to be derived automatically by system 100 in accordance to the password length.

Figure 7:
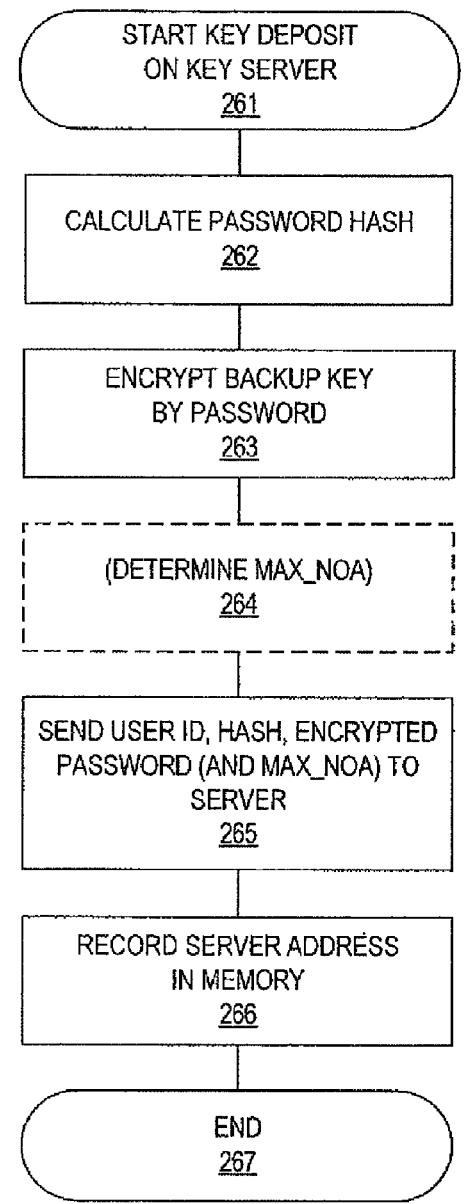
FIG. 7 is a flowchart of the procedure for storing a backup key in an internet server.

FIG. 7, with reference also to FIG. 3, is a flow chart of bow record 250 (an embodiment of backup key copy 140) is deposited on key server 140A during steps 207-208. The procedure starts in step 261, as step 207 of FIG. 3 has been triggered. In step 262 the hash of the password received in step 204 is calculated. In step 263 the backup key from step 206 is encrypted using the password. In step 264, the MAX_NOA is optionally determined, for example by user selection through interface 130 or automatically from the password length. In step 265, computer 110 connects with internet server 140A and sends thereto the user ID, password hash, encrypted backup key, and optionally also the entered or calculated MAX_NOA; this communication preferably is made using a secure communication protocol such as secure socket layer (SSL) to protect its contents, because the encryption of the backup key by the password may not withstand a brute-force attack. In step 266 (an embodiment of step 208 of FIG. 3), the internet address of server 140A is recorded in memory 102; this address is included in backup medium 120 to facilitate a future restore procedure. The procedure is concluded in step 267, after record 250 has been stored internet server 140A.

Figure 8:
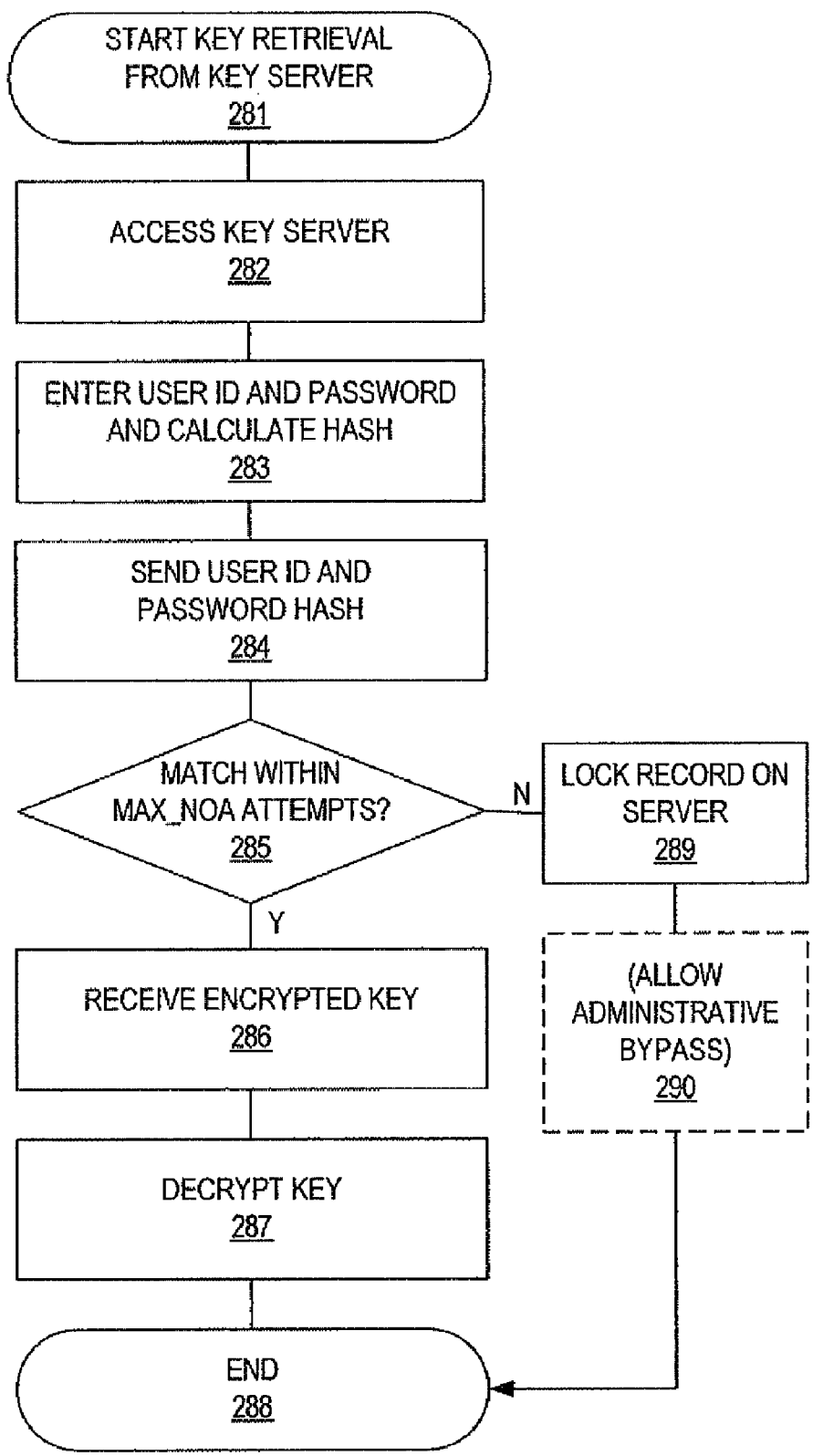
FIG. 8 is a flowchart of the procedure for retrieving a backup key from an internet server.

FIG. 8, with reference also to FIG. 5, is a flowchart of the key retrieval steps 222-223 of the backup key, in the internet server scenario. Step 281 starts when step 222 of FIG. 5 is triggered, identifying the location of backup key copy 140 as key server 140A, and retrieving the internet address of key server 140A. In step 282, computer 110 communicates with key server 140A over the internet, preferably using a secure protocol such as secure socket layer (SSL). In step 283, the user enters his or her user ID and password through user interface 130, and computer 110 calculates the password hash. The password entered by the user in step 283 is referred to herein as an "alleged" password. In step 284, the user ID and password hash are sent from computer 110 to key server 140A. In step 285, key server 140A seeks user record 250 by user ID 251, and checks whether the hashed password received from computer 110 matches that recorded in register 252; if a match is positive within MAX_NOA attempts, computer 110 receives in step 286 the encrypted backup key from record 254 of server 140A, and in step 287 decrypts the backup key with the user's password, to obtain the clear backup key, which is used for restoring the contents in steps 224-228 of FIG. 5. If no match is reached in step 285 within MAX_NOA attempts, then in step 289 record 250 is locked by server 140A, to prevent additional guesses within a brute force attack. Optional step 290 may still allow access to record 250 by administrative decision, e.g. when an authorized officer identifies the user in person and allows him/her access to his/her key. Step 288 concludes the procedure.

Figure 9:
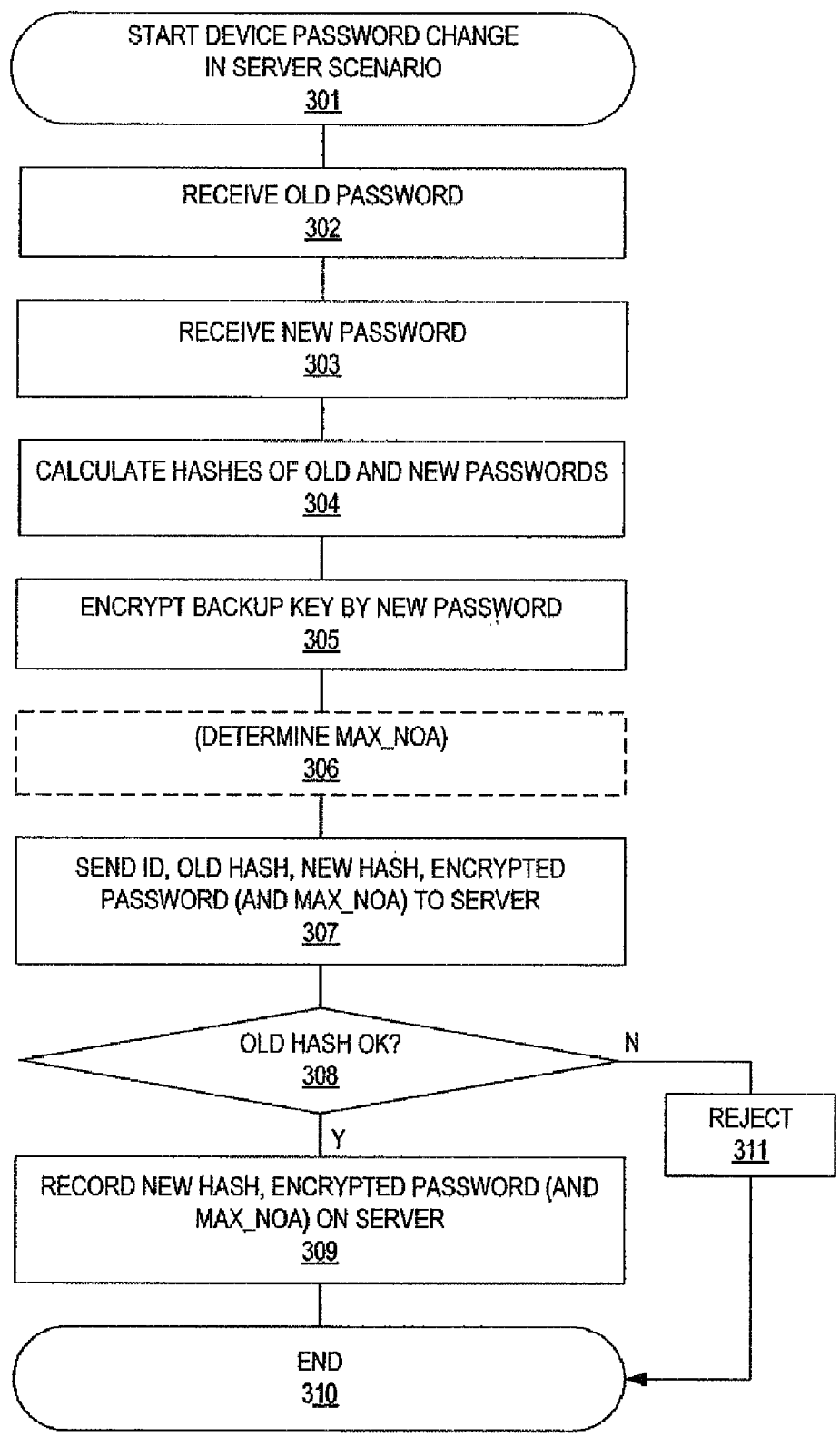
FIG. 9 is a flowchart of the procedure for changing a user password on an internet server.

It will be appreciated that the user's password is used several times with respect to the procedure of FIGS. 6-8. The user's password is used to encrypt the backup key stored in server 140A, and then, in a hashed form, to allow the user to access his/her record 250 on server 140A. However, it is quite customary to change user passwords from time to time, with the older passwords expiring and forgotten by the users. In such a case, a backup made with an expired password may become inaccessible. FIG. 9 presents a flowchart of an enhanced procedure for password update, to maintain synchronization between the current user password and the password used with respect to record 250. The procedure starts in step 301, where computer 110 connects to server 140A, and the user asks for password change through user interface 130. In steps 302 and 303, the user enters his/her old and new passwords, respectively, through user interface 130. If the same user password is used also to access the contents protected within memory 102, as described for example in copending U.S. patent application Ser. Nos. 10/304,772 and 10/359,195, then the appropriate updates (not shown) to memory 102 are made after step 303. In step 304, the hashes of the old and new password are calculated by computer 110, and in step 305 the backup key, retrieved from memory 102, is encrypted by the new password. In optional step 306, MAX_NOA is recalculated, for example as a result of a different length of the new password in comparison to the old password. In step 307, the user ID, hashes of old and new passwords, and MAX_NOA are sent from computer 110 to server 140A. Server 140A checks the old password in step 308, and if the old password is OK, record 250 is updated with an encrypted key, password hash, and optionally MAX_NOA, according to the new password. Otherwise, in step 311 the user is notified and the record is not updated. The procedure is concluded in step 310.

Alternatively, backup key copy 140 is kept in the form of a pocketable medium 140B, such as a printed slip of paper or a floppy diskette. In this case, it is presumed that the user will take the necessary precautions to ensure his/her access to the copy while excluding the access of others.

Figure 10:
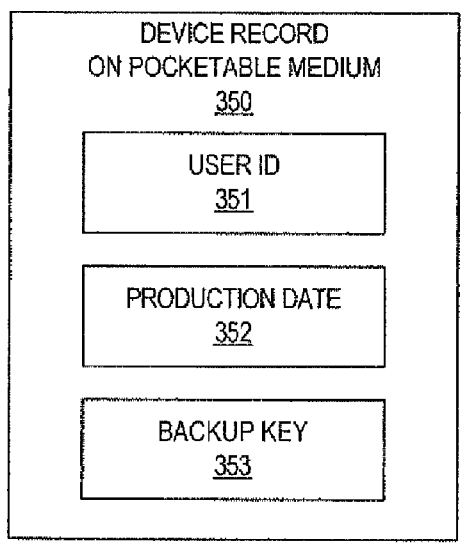
FIG. 10 shows a record of a backup key as stored in a pocketable medium.

FIG. 10 illustrates the contents of the record printed or otherwise recorded on pocketable medium 140B. A user ID 351 and a production date 352 are recorded as reminders for the user, to ensure that the record relates to the correct portable storage device 101. A backup key 353 is also recorded, to be read manually or mechanically when needed. In the exemplary embodiment, the key is recorded in clear, and so maintains its validity irrespective of device password changes.

Figure 11:
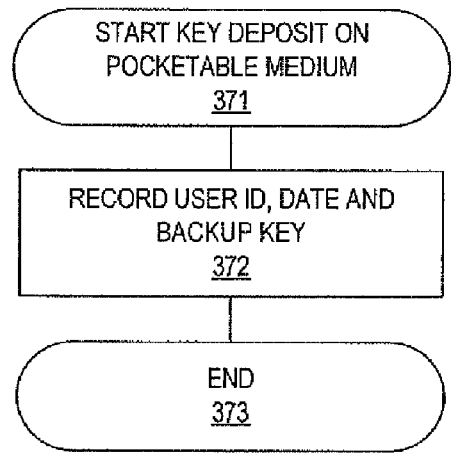
FIG. 11 is a flowchart of the procedure for storing a backup key in a pocketable medium.

FIG. 11, which is an exemplary embodiment of step 207 of FIG. 3, is a flowchart of key deposit on a pocketable medium 140B. In step 371 a paper page is fed into the printer of computer 110 or a diskette is instated into the diskette drive of computer 110. In step 372, the user ID, the current date and the backup key are recorded on the paper page or floppy diskette. In step 373, the paper page or diskette is removed from computer 110 and secured by the user. This which concludes the procedure.

Figure 12:
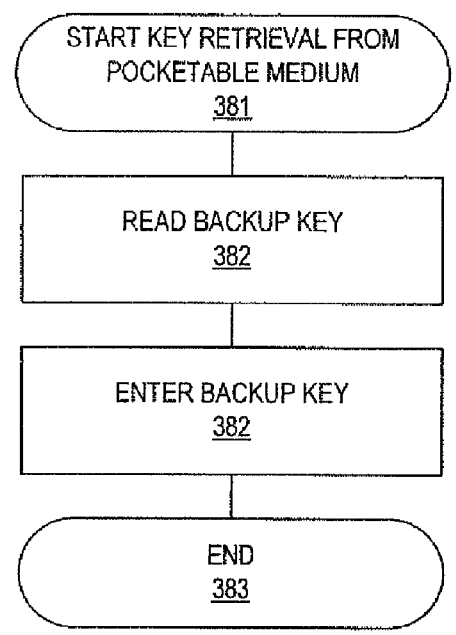
FIG. 12 is a flowchart of the procedure for retrieving and using a backup key from a pocketable medium.

FIG. 12, which is an exemplary embodiment of step 223 of FIG. 5, is a flowchart of the retrieval of the backup key from pocketable medium 140B. In step 281 pocketable medium 140B, for example a paper page or a floppy diskette, is obtained by the user from its secure storage place, such as a safe or pocket. In step 382 the key is read from pocketable medium 140B, either by computer 110 or by the users and in step 382 the key is entered into computer 110, either directly or by the user through user interface 130. In step 383 the procedure is completed, allowing moving to step 224 of the general restore procedure of FIG. 5.

According to another alternate preferred embodiment of the present invention, backup key copy 140 is kept on a trusted PC 140C, for example the user's home PC. Then backup medium 120 can be the hard disk of that computer 140C, or backup medium 120 can be separated, for example to a portable PC 140C carried with a business traveler.

Figure 13:
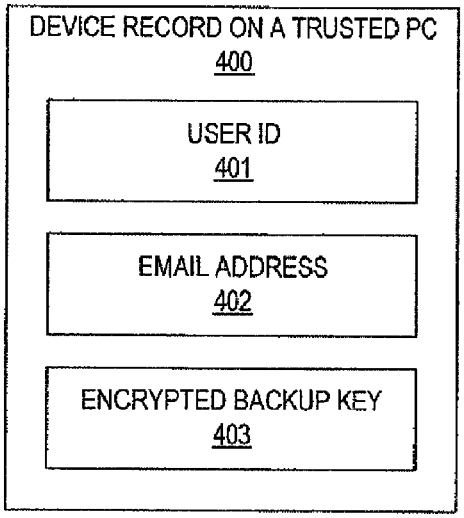
FIG. 13 shows a record of a backup key as stored in a trusted computer.

FIG. 13 illustrates the related record 400 kept in a file on trusted PC 140C. Record 400 includes a user ID 401, the user's email address 402 to allow sending the key to the user, and an encrypted backup key 423, i.e. the backup key produced in step 206 of FIG. 3, encrypted using the user password.

Figure 14:
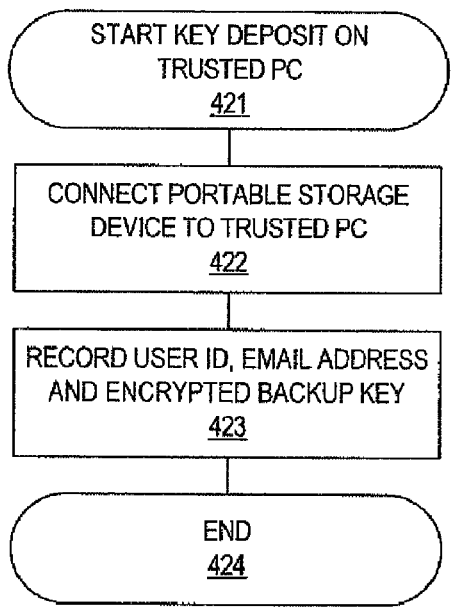
FIG. 14 is a flowchart of the procedure for storing a backup key in a trusted computer.

FIG. 14 is a flowchart of a key deposit procedure, on a trusted PC 140C, that is another preferred embodiment for step 207 of FIG. 3. In step 422, portable storage device 101 is connected to trusted PC 140C, which can be either the same computer as computer 110 or a different computer than computer 110. In step 423, the user enters his/her password, user ID and email address, the backup key is retrieved from memory 102 and is encrypted by the password, and then a record containing the user ID, the email address and the encrypted backup key is saved in trusted PC 140C, in a record 400 as illustrated in FIG. 13. The procedure is concluded in step 424.

Figure 15:
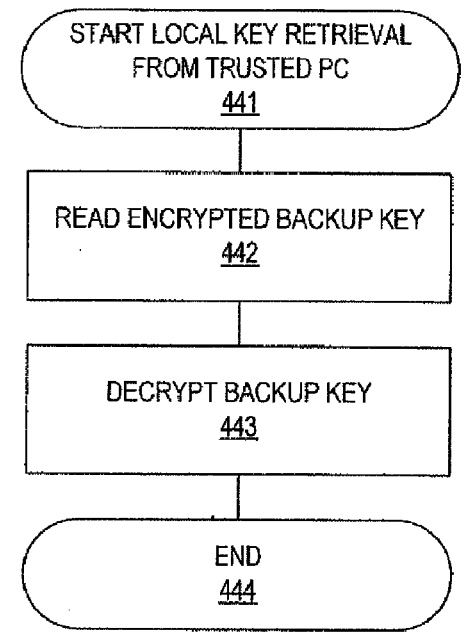
FIGS. 15 and 16 are flowcharts of procedures for retrieving a backup key from a trusted computer.

FIG. 15 is a flowchart of the retrieval of the backup key from a trusted PC 140C done locally, i.e. when the restore procedure of FIG. 5 is carried out at a computer 110 that is the same as trusted PC 140C. The procedure is triggered at step 441 by the activation of step 222 of FIG. 5. In step 442, the encrypted backup key is retrieved from field 403 of record 400 of trusted computer 140C. In step 443 the key is decrypted, using the user's password entered via user interface 130. In step 444 the procedure is concluded by providing the backup key to step 224 of FIG. 5.

Figure 16:
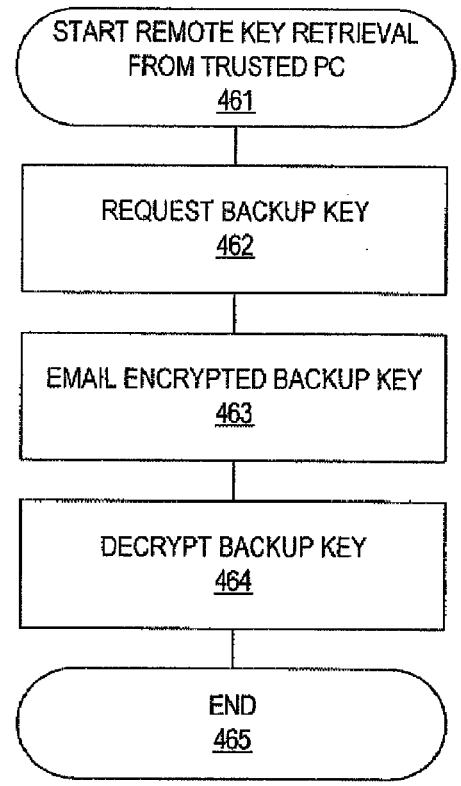

FIG. 16 is a flowchart of the retrieval of the backup key from a trusted PC 140C done remotely, i.e. when the restore procedure of FIG. 5 is carried out at a computer 110 that is remote from trusted PC 140C. The procedure is triggered in step 461 by the activation of step 222 of FIG. 5. In step 462, the user either operates his/her trusted PC 140C from his/her current computer 110 using a remote control utility well-known in the art, or calls a trusted colleague to operate trusted PC 140C. In either case, in step 463 trusted PC 140C is activated to access record 400 stored therein, and to send encrypted key 403 to email address 402. In step 464 the encrypted backup key is received by email at computer 110, and is decrypted, using the user's password entered via user interface 130. In step 465 the procedure is concluded by provided the backup key to step 224 of FIG. 5.

It will be clear to those skilled in the art that a procedure for password update, similar to that FIG. 9, can be devised also for the trusted PC scenario. For conciseness, this procedure is not discussed herein in detail.

Security Considerations

The following arguments highlight some of the security considerations that guide the design of specific embodiments of the present invention. Some of the arguments have already been introduced above and are repeated here for completeness.

The prior art provides very strong encryption algorithms, that practically exclude the possibility of calculating the encryption key from an encrypted file. However by using a 'brute force attack' an adversary can attempt guessing all possible keys to try to decrypt the encrypted file. There are two approaches to defeat brute force attacks: (1) using long-enough keys; (2) using shorter keys in combination with MAX_NOA, i.e. blocking access upon teaching a predefined maximum number of attempts.

If an encryption key uses, for instance, 64 randomly-selected bits, then a brute-force attack requires checking about $10^{19}$ possibilities, which requires thousands of years to accomplish with today's computers. However, random 64-bit keys are impractical to memorize, which implies that a copy of the key must be kept in a safe place. The present invention recognizes that the backed-up content needs to be encrypted by a long key, because backup medium 120 is typically a passive storage medium, such a hard disk or an optical disk, that is unsuitable for robust MAX_NOA applications. Therefore, a backup key copy 140 needs to be used.

Three preferred methods are described above for storing backup key copy 140. They are internet server 140A, pocketable medium 140B, and trusted PC 140C, and they are not mutually exclusive, thus a user may select to have more than one copy of is his backup key. The methods differ in their security, survivability over years of no use, and availability in remote places. The method of choice for the circumstances of many users is internet server 140A (particularly if the internet is the Internet) accessed via a secure protocol such as secure socket layer (SSL). Retrieval of the backup key from internet server 140A requires presentation of a representation of the password, preferably the hash of the password, which is protected by the server-level MAX_NOA procedure against brute-force attacks.

It should be noted also that the contents of memory 102 of portable storage device 101 is typically encrypted by a separate procedure, for example as described in co-pending U.S. patent application Ser. Nos. 10/304,772 and 10/359,195. Preferably, the same user password is used for both accessing the content of portable storage device 101 and accessing backup key copy 140 on internet server 140A, because users prefer to avoid memorizing too many passwords.

One might have the impression that if the contents of memory 102 are encrypted, then it is unnecessary to encrypt those contents again for storage on backup medium 120. It will be appreciated that to protect the contents of memory 102 against brute force attacks, one must use a long-enough encryption key, that is normally kept in reproducible protected area 102C. This key must be included in the contents backed up onto backup medium 120. Thus, if the contents of backup medium 120, or at least part of those contents, are not encrypted again, the backup security will be compromised.

The encryption key used for securing the contents of memory 102 and the encryption key used for backing up the contents of memory 102 could be identical or different. Preferably, these keys are different, to add another layer of security if backup copy 140 is found or somehow retrieved by a third party.

The encryption and decryption procedures, that are included in the present invention, can be performed by either processor 103 or computer 110, or shared between the two. However, in some scenarios, computer 110 may be untrusted, for example if a computer of a public service bureau is used to make a backup CD. In such cases, it is preferable for all encryption and decryption transactions to be done by processor 103, and to include at least the password-entry functionality of user interface 130 within portable storage device 101.

Complete vs. Incremental Backup

Some current portable flash storage devices have capacities of hundreds of megabytes. Backing up the contents of such a device may be time consuming. Often, however, only a small part of memory 102 will have been changed since the previous backup, and therefore the provision of incremental backup is advantageous.

Preferably, before running a backup procedure between portable storage device 101 and backup medium 120, computer 110 checks whether contents from a previous backup already reside on backup medium 120. If the answer is positive, computer 110 preferably runs an incremental backup procedure, wherein only the contents that have been changed since the last backup recorded on backup medium 120 are updated.

In one embodiment of the present invention, incremental backup is done at the file level, i.e. files that have been changed since the previous backup are identified and updated. In this case, the backup procedure may use well known, commercial backup or file-synchronization utilities, such as the Briefcase™ utility of the Windows™ operating system.

Alternatively, a sector-level comparison is done to identify the sectors that have been changed, and to update these sectors. This can be especially advantageous if the contents of portable storage device 101 are encrypted, and it is not desirable to decrypt them prior to making an incremental backup. The identification of changed sectors is done by comparing sectors between the current and backed-up versions, or alternatively by maintaining and comparing sector signatures, such as checksums, hash or error-correction codes, to identify changed sectors.

If an incremental backup is infeasible because of lack or inconsistency of information, there is always a fallback option of making a complete backup.

While the invention has been described with respect to a limited number of embodiments, it will be appreciated that many variations, modifications and other applications of the invention may be made.

What is claimed is:

1. A portable storage device that is removably connectable to a computer for backing up original data stored in the portable storage device, the portable storage device comprising:

a memory for storing the original data; and
   a processor operative:
   to receive a backup command from the computer,
   in response to said backup command, to encrypt the original data, thereby providing first encrypted backup data that are different than the original data,
   to export said first encrypted backup data to a first backup medium that is separate from the portable storage device, to receive second encrypted backup data from a second backup medium that is separate from the portable storage device, and to decrypt said second encrypted backup data, thereby providing recovered data.

2. The portable storage device of claim 1, wherein said processor also is operative to store said recovered data in said memory.

3. The portable storage device of claim 1, wherein said second backup medium is said first backup medium.

4. The portable storage device of claim 1, wherein said second backup medium is separate from said first backup medium.

5. The portable storage device of claim 1, wherein said second encrypted backup data and said first encrypted backup data are identical.

6. The portable storage device of claim 1, wherein said second encrypted backup data are different than said first encrypted backup data.

7. The portable storage device of claim 1, wherein said processor is further operative:

to generate said second encrypted backup data; and to export said second encrypted backup data.

8. The portable storage device of claim 1, wherein said second encrypted data is generated by a separate portable storage device.

9. A system for storing data, comprising:

a first portable storage device that is removably connectable to a computer for backing up original data stored in said first portable storage device, wherein said first portable storage device includes:

a first portable storage device memory for storing said original data, and a first portable storage device processor operative:

to receive a backup command from the computer, in response to said backup command, to encrypt said original data, thereby providing encrypted backup data that are different than said original data, and to export said encrypted backup data to a backup medium that is separate from said first portable storage device, a second portable storage device that includes:

a second portable storage device memory, and a second portable storage device processor operative:

to receive said encrypted backup data from said backup medium, and to decrypt said encrypted backup data, thereby providing recovered data for storing in said second portable storage device memory.

10. The system of claim 9, wherein said second portable storage device is said first portable storage device.

11. The system of claim 9, wherein said second portable storage device is separate from said first portable storage device.

12. The system of claim 9, wherein said first portable storage device processor encrypts said original data using a backup key, the system further comprising:

said backup medium; and a backup key storage medium, separate from both said first portable storage device and said backup medium, for storing said backup key.

13. The system of claim 12, wherein said backup key storage medium includes an internet server.

14. The system of claim 13, wherein said internet server includes a memory area for storing both said backup key and a representation of an encryption password that is used to encrypt said backup key prior to said storing of said backup key in said memory area.

15. The system of claim 14, wherein said representation of said encryption password is a hash of said encryption password.

16. The system of claim 12, wherein said backup key storage medium includes a pocketable medium.

17. The system of claim 12, wherein said backup key storage medium includes a trusted computer.

18. A method of securely storing original data, comprising:

storing the original data in a first portable storage device;

removably connecting said first portable storage device to a computer for backing up said original data;

in response to at least one backup command received by said first portable storage device from said computer:

encrypting the original data, using a processor of said first portable storage device, thereby providing encrypted backup data that are different than the original data, and exporting said encrypted backup data to a backup medium that is separate from said first portable storage device, receiving said encrypted backup data, by a second portable storage device;

decrypting said encrypted backup data, using a processor of said second portable storage device, thereby providing recovered data; and storing said recovered data in said second portable storage device.

19. The method of claim 18, wherein said second portable storage device is said first portable storage device.

20. The method of claim 18, wherein said second portable storage device is separate from said first portable storage device.

21. The method of claim 18, wherein the original data are encrypted using a backup key, the method further comprising:

protecting said backup key, thereby providing a protected backup key; and retrieving said protected backup key;

and wherein said encrypted backup data are decrypted using said retrieved backup key.

22. The method of claim 21, wherein said protecting of said backup key includes storing said backup key in an internet server.

23. The method of claim 21, wherein said protecting of said backup key includes storing said backup key in a pocketable medium.

24. The method of claim 21, wherein said protecting of said backup key includes storing said backup key in a trusted computer.

25. The method of claim 21, wherein said protecting of said backup key includes encrypting said backup key and wherein said retrieving of said protected backup key includes decrypting said protected backup key.

26. The method of claim 25, wherein said encrypting of said backup key is effected using an encryption password, wherein said protecting of said backup key further includes storing said encrypted backup key in a backup key storage device, and wherein the method further comprises:

providing an alleged password to said backup key storage device, said retrieving of said protected backup key being permitted by said backup key storage device only if said alleged password is identical to said encryption password.

27. The method of claim 26, wherein said backup key storage device allows only a predetermined number of attempts to provide said alleged password.

28. The method of claim 26, further comprising:
changing said encryption password.

29. The method of claim 21, further comprising:
storing in said first portable storage device a description of said protecting of said backup key.

30. The method of claim 21, wherein said protecting of said backup key includes:
encrypting said backup key; and
storing said encrypted backup key in a backup key storage device that is independent of said backup medium.

31. The method of claim 21, further comprising:
storing in said backup medium a description of said protecting of said backup key.

* * * * *